United States Patent [19]
Everett

[11] 3,900,176
[45] Aug. 19, 1975

[54] AIRCRAFT

[76] Inventor: Robert A. Everett, 704 S. 142 E. Ave., Tulsa, Okla. 74108

[22] Filed: Jan. 31, 1974

[21] Appl. No.: 438,233

Related U.S. Application Data

[63] Continuation-in-part of Ser. No. 365,555, May 31, 1973, abandoned.

[52] U.S. Cl. .................................... 244/6; 244/39
[51] Int. Cl. ............................................. B64c 27/30
[58] Field of Search ........ 244/39, 34 R, 6, 7 R, 7 A, 244/12 R, 15, 18

[56]  References Cited
UNITED STATES PATENTS

| | | | |
|---|---|---|---|
| 1,753,112 | 4/1930 | Engledow | 244/6 |
| 2,036,011 | 3/1936 | Barrett | 244/39 |
| 2,753,132 | 7/1956 | Gley | 244/6 |
| 3,149,800 | 9/1964 | Sintes et al. | 244/7 R |

FOREIGN PATENTS OR APPLICATIONS

| | | | |
|---|---|---|---|
| 799,420 | 6/1936 | France | 244/39 |
| 418,121 | 10/1934 | United Kingdom | 244/7 R |

Primary Examiner—Duane A. Reger
Assistant Examiner—Paul E. Sauberer

[57] ABSTRACT

The disclosure is of a lift rotor adaptable to various forms of fixed wing aircraft. The autorotating rotor is attached to the aircraft, so that the flight movement of the aircraft will pass air against the device and spin the rotor, thereby generating lift forces. When the rotor is power driven the additional lift force can be controlled by the power source.

7 Claims, 13 Drawing Figures

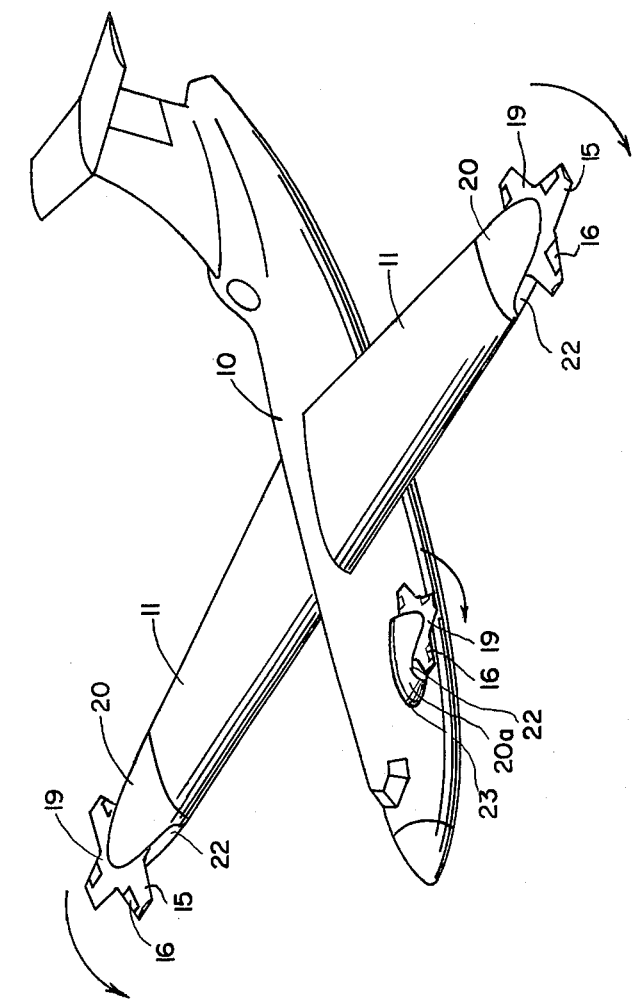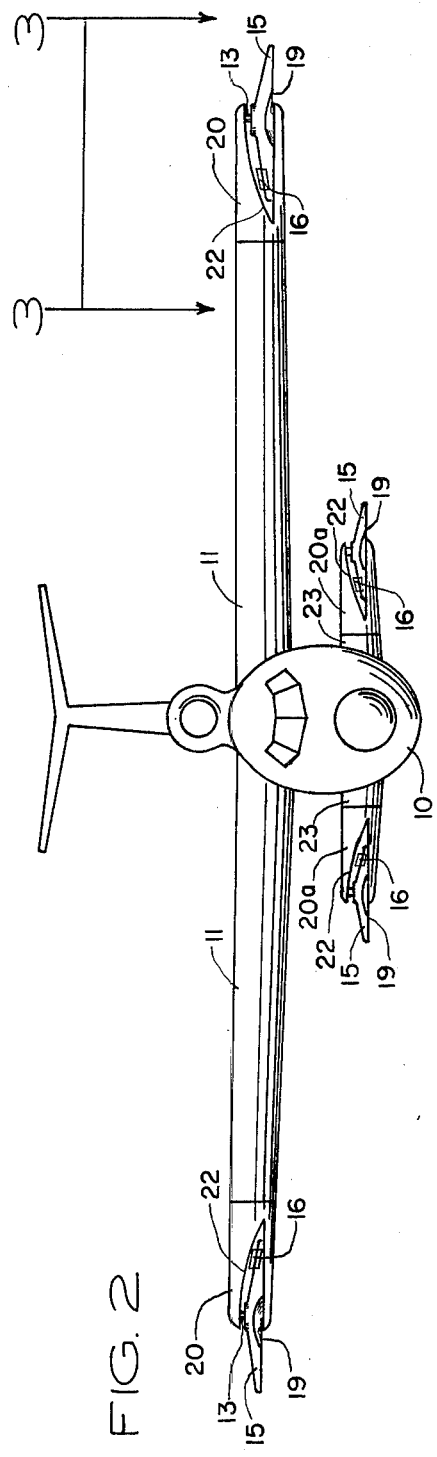
FIG. 1
FIG. 2

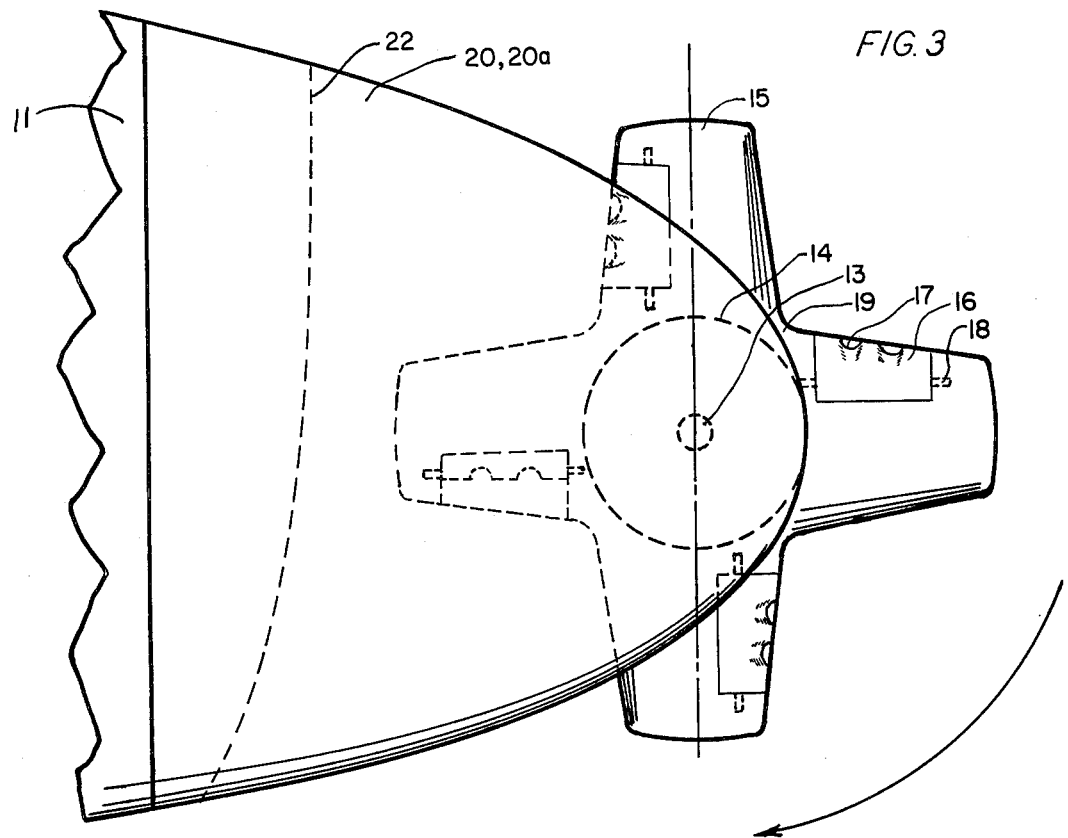
FIG. 3
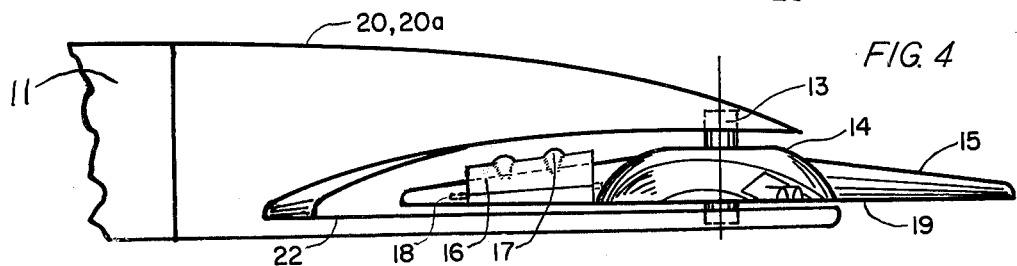
FIG. 4
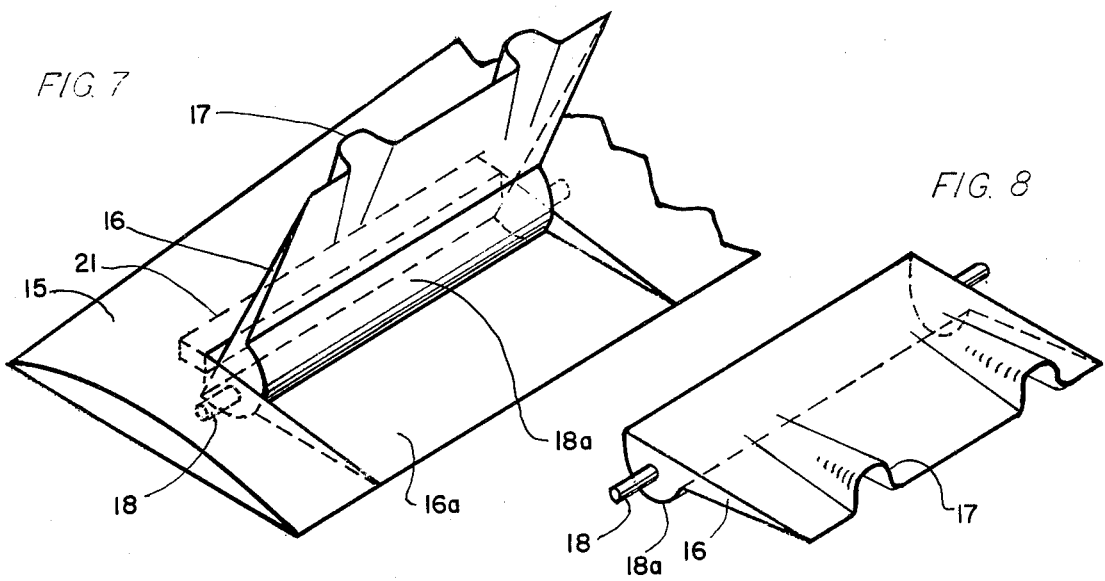
FIG. 7
FIG. 8

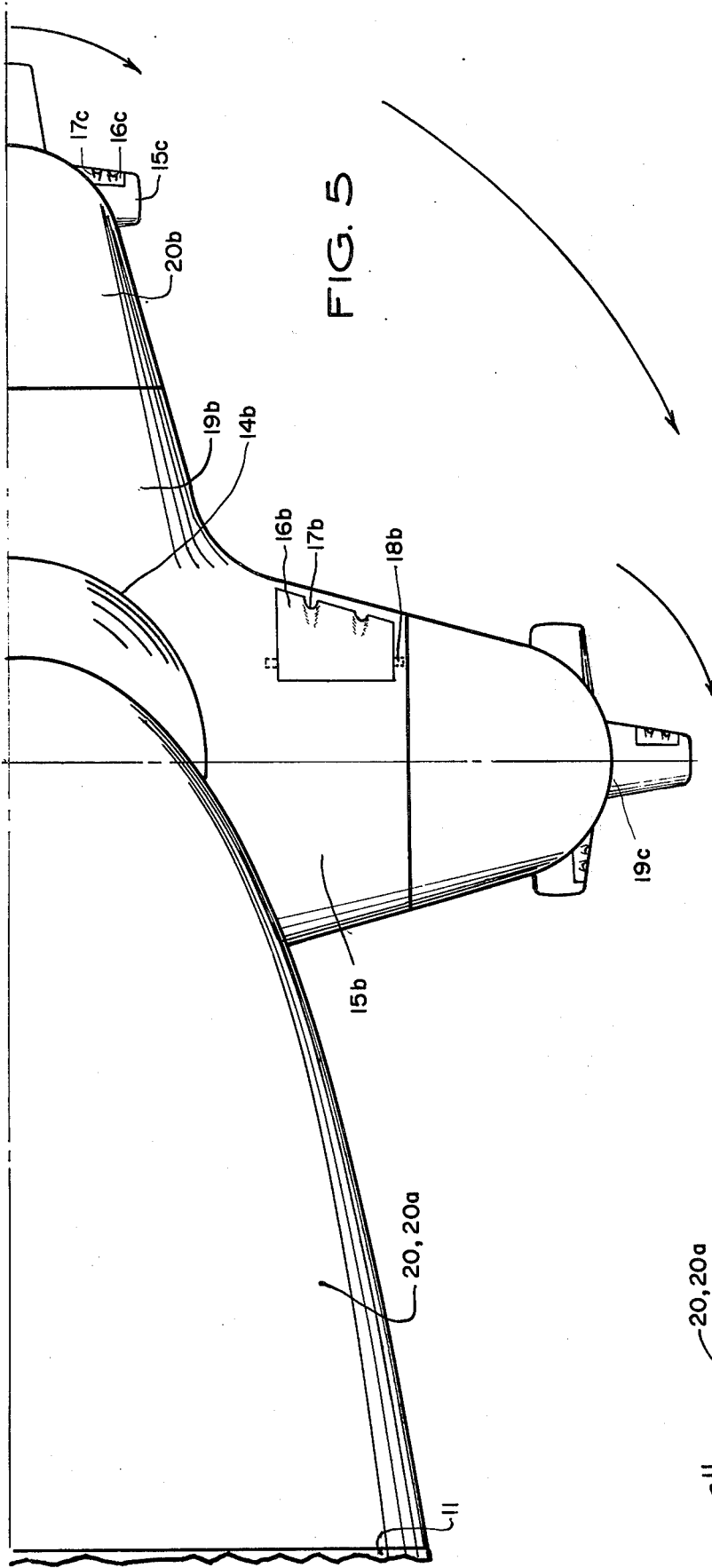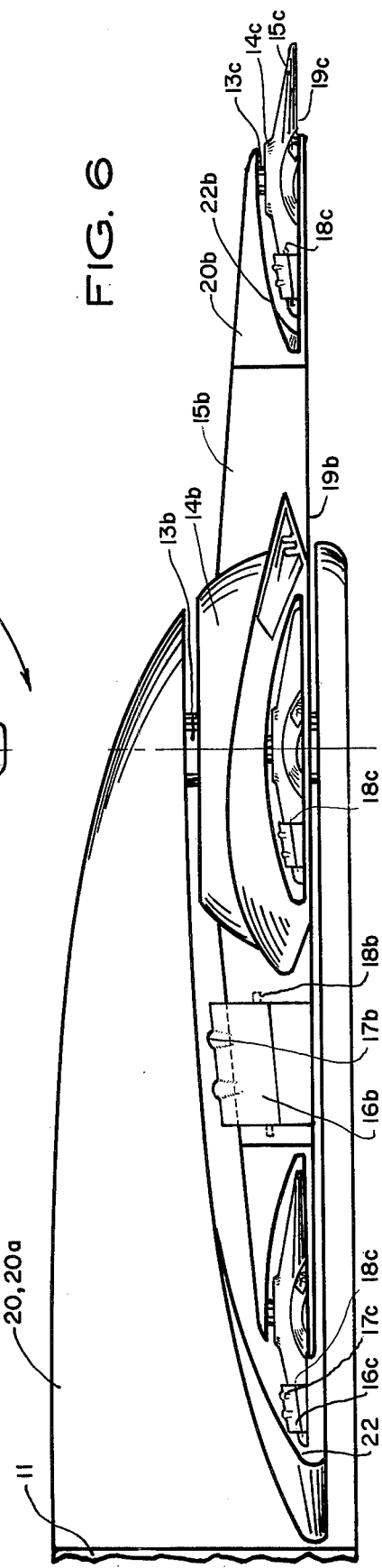

AIRCRAFT

This application is a continuation-in-part of Ser. No. 365555, filing date of May 31, 1973, now abandoned.

BACKGROUND OF THE INVENTION

1. Field of the Invention

This invention relates to fixed wing aircraft, which have horizontal rotors attached to generate lift forces on the aircraft. More particularly, the invention relates to horizontal rotors mounted at the ends of the fixed wings of the aircraft or in wing-like extentions from the fuselage of the aircraft.

2. Description of Prior Art

Airplane designers in the past have attempted to create heavier-than-aircraft which combine the hovering ability of a helicopter with the high forward speed of conventional aircraft. They have designed the so-called convertiplanes; which are aircraft having features of vertical and high speed horizontal flight. Aircraft with these features have had designs too numermous to list here. I now note there are designs using fairly large rotors for vertical flight and fixed wings to generate lift in horizontal flight.

In designing convertiplanes, there have been attempts to retract or otherwise eliminate the rotor's drag and lift forces in high speed horizontal flight. The fundamental disadvantage is the complication of housing the rotor, so the problem includes that of transition. The rotor has to be stopped and the wing surfaces deformed in a manner unfavorable for lift production.

Also a large portion of the rotor downwash can fall onto the top of the wing, thereby reducing flight efficiency. There are many practical problems involved in making the transition from rotary wing to fixed wing flight, but the more severe are the problems of starting or stopping the rotors in flight. These disadvantages and problems, along with the obvious one in the complexity of power driving the lift rotors have not, to my knowledge, been solved.

SUMMARY OF THE INVENTION

The object of this invention is to mount power driven or autortating, rigid lift rotors at the tip of the fixed wings of the heavier-than-aircraft to generate lift.

It is another object of this invention to provide fixed wing aircraft with pairs of symmetrically disposed lift rotors that counter-rotate to add equal lift to each side of the aircraft's fuselage.

Another object of this invention is to provide a housing for the lift rotor and also that autorotation of the life rotors will be accelerated.

A further object of this invention is to store the lift rotors within the fuselage and wing tips of the aircraft to offer minimal drag and to remove the rotors from storage and into an operative position with a simplified structure.

Another object of this invention is to provide an aircraft with the lift rotors so as to provide added lift for safe descent in the event of power failure of forward thrust to the aircraft.

It is still another object to provide the lift rotors with smaller second stage lift rotors, at the main rotors' blades, to multiply the main lift rotors' lift capabilities.

Another object is to provide means for allowing adjustable pitch change for the lift rotors by a simplified tilting of the complete wing tip rotor assembly.

BRIEF DESCRIPTION OF THE DRAWINGS

FIG. 1 is a perspective view of an aircraft constructed in accordance with this invention;

FIG. 2 a front elevation of the aircraft of FIG. 1;

FIG. 3 is a plan view of the wing tip rotor assembly;

FIG. 4 is an elevation view of the wing tip rotor assembly;

FIG. 5 is a plan view of the wing tip rotor assembly showing a two stage lift rotor;

FIG. 6 is a side elevation view of the wing tip rotor assembly of FIG. 5;

FIG. 7 is a perspective view of a partial rotor blade showing a rotor flap in the open position;

FIG. 8 is a perspective view of the lift rotor flap and air scoops;

DESCRIPTION OF THE PREFERRED EMBODIMENT

Figure 9:
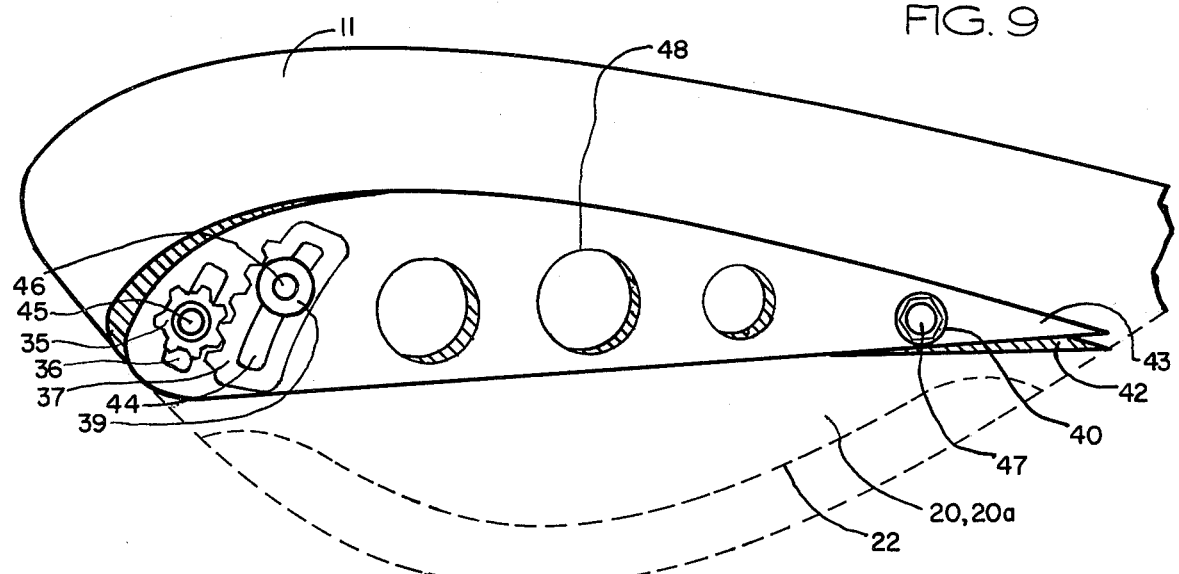
FIG. 9 is an end view of a wing tip showing the mounting rib section and showing the pitch adjustment.

Referring to FIG. 1, there is shown a perspective view of an aircraft having wings 11 on each side of the fuselage 10. At the wing 11 tips are disposed wing tip rotor assemblies 20 including lift rotors 19. Also located along the sides of the fuselage 10 are short wing tip rotor assemblies 20a, which also include lift rotors 19 that are mounted to the fuselage mounts 23, FIG. 2 shows this structure in front elevation. These lift rotors 19 are designed in such a manner as to allow them to autorotate into the direction of flight to create lift.

In FIGS. 3 and 4, the lift rotor 19 is shown to include a vertical axis 13, a hub 14 and a plurality of rotor blades 15. Each of the rotor blades 15 have aerodynamics, designed for maximum lift capabilities. These lift rotors 19 can be located partially inside a slot opening 22, of the wing tip rotor assembly 20 and 20a.

Mounted in the trailing edge of each rotor blade 15 is a flap 16 located in a flap housing 16a, with each flap 16 having air scoops 17 along its surface as shown in FIGS. 7 and 8. These scoops 17 are formed as shown, facing to the rear of the rotor blades 15 direction of rotation. As the lift rotor blade 15 enters the leading edge of the slot opening 22 the passing air in the slot opening 22 will catch the scoops 17 and pivot the flap 16 open on its horizontal flap axis 13 and 18a to a vertical position and stopping in this position against a reinforced stop 21 and exposing the underside of the flap 16. The passing air, which acted upon the scoops 17, will then push-against the underside surface of the flap 16 and in turn will force the lift rotor 19 to spin around its vertical axis. This flap device then provides the force means for the autorotating of the lift rotor 19 into the direction of flight and creating lift forces. After the rotor blade 15 passes completely through the slot opening 22 and out the trailing edge, there is no longer any air pushing against the flap 16. With no air pressure against the flap 16, it will then drop backinto the flap housing 16a until the rotor blade 15 again makes a revolution and again begins to enter the leading edge of the slot opening 22 and the above said operation is repeated. This slot opening 22 helps accelerate the air as the air enters the leading edge of the slot opening 22 along with the rotor blades 15. The air is accelerated because of the restricted design of the slot opening 22 and will increase the air velocity by ram air action and in turn increase the rotation speed of the autorotating lift rotor 19. So the greater the spin, the more lift is generated by the rotor on the wing-to which it is attached.

Each pair of lift rotors 19 on the aircraft are arranged to spin in opposite directions to each other. Therefore the necessary lift balance is generated on each side of the aircraft's fuselage 10. With these spinning autorotating lift rotors 19 generating separate lift capabilities and accelerating as the aircraft gains speed, the aircraft will become airborne much sooner on take off than the normal aircraft, not so equipped. This vertical lift will also enable the aircraft to use a less nose-down attitude approach, upon landing.

The short wing tip rotor assembly 20a is mounted on the fuselage 10 and has the same construction and function as that of the wing tip rotor assembly 20. The short wing tip rotor assembly 20a differs from the wing tip rotor assembly 20 only in its size and location. The short wing tip rotor assembly 20a does not have to match up with the contour of any fixed wing, but can be any size and located in any number of pairs along each side of the fuselage 10. If it is not practical to use the wing tip rotor assembly 20, the short wing tip rotor assembly 20a could be installed, or a combination of both might be used. In all combinations of 20 and 20a these pairs must be mounted symmetrically on the aircraft and in counter rotation to each other to maintain symmetrical lift balance and stabiltiy.

FIGS. 5 and 6 show lift rotor 19b as having its own wing tip rotor assembly 20b located at the tips of rotor blade 15b. These smaller lift rotors 19c have the same construction as rotors 19 and function as second stage generators of lift force, a third stage or additional numbers of lift rotor stages may be practical. These extra stages of small lift rotors 19c function to generate additional lift, since they contain all the components; vertical axis 13c, hub 14c, blades 15c, flap 16c, air scoop 17c, horizontal flap axis 18c and a slot opening 22b and function the same as the first stage lift rotor 19 and generate their own lift and spin by the movement of air over and against their surfaces.

Figure 10:
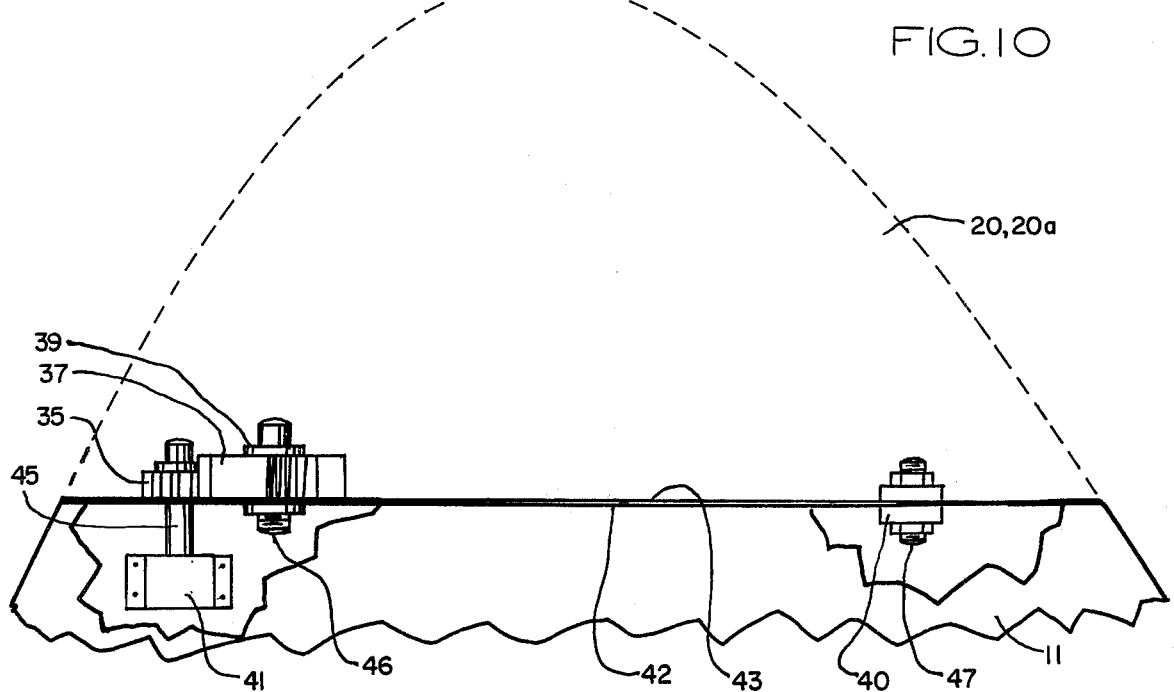
FIG. 10 is a bottom plan view of the wing tip of FIG. 9.

It is obvious that the rotor blades 15 can be constructed with variable pitched blades. But with wing tip rotor assemblies 20 and 20a that have only part of the rotor 19 being exposed to create lift, it may be more practical to make the pitch adjustment by moving the whole wing tip rotor assembly 20 and 20a. They can be tilted slightly in order to give pitch to the rotor 19 manually or by power means 41. In a small aircraft this pitch angle can be made by hand crank while in flight or set at the desired angle on the ground through access plates in the skin of the wing 11 and wing tip rotor assembly 20 and 20a and set the desired pitch by moving the wing tip rotor assembly 20 or 20a via the pivot mounting assembly 40 and axis 47 and the pinion gear 35 and rack gear 37 as shown in FIGS. 9 and 10. The pinion gear axis 45 is mounted on the main wing 11 and its pinion gear 35 is located within the wing tip rotor assembly 20 or 20a through the elongated slot 36 in the main wing rib 42 and wing tip rib 43 to mesh with the rack gear 37. The rack gear assembly 37 is fastened to the wing tip rib 43 and is connected to the main wing rib 42 via slip fit assembly 39 and axis 46 through an elongated slot 44. This gear assembly 35 and 37 can be power driven remotely by a power unit 41 mounted inside the main wing 11 or fuselage 10 to give the desired pitch to the complete wing tip rotor assembly 20 or 20a when desired. Lightening holes 48 are also shown in the wing tip rib 43 and in the main wing rib 42.

Figure 11:
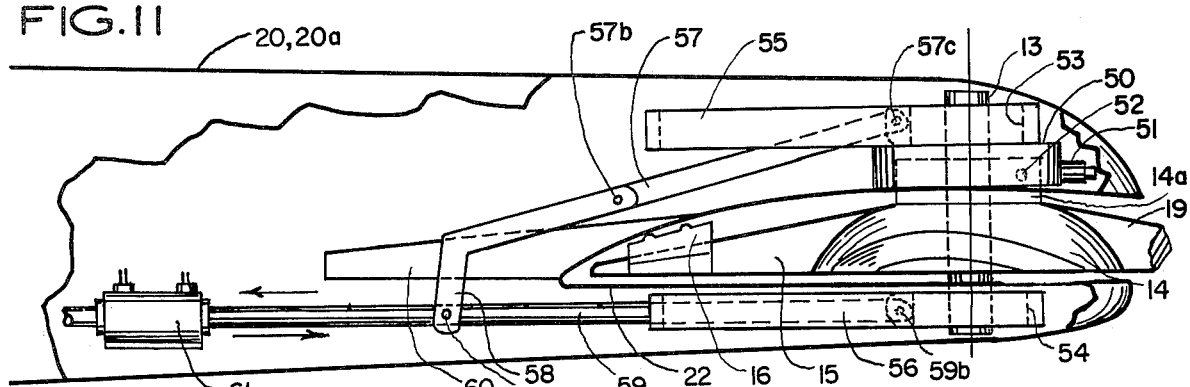
FIG. 11 is an elevation view with the skin surface cut away, of the wing tip rotor assembly, showing the retraction and extention structure.
Figure 12:
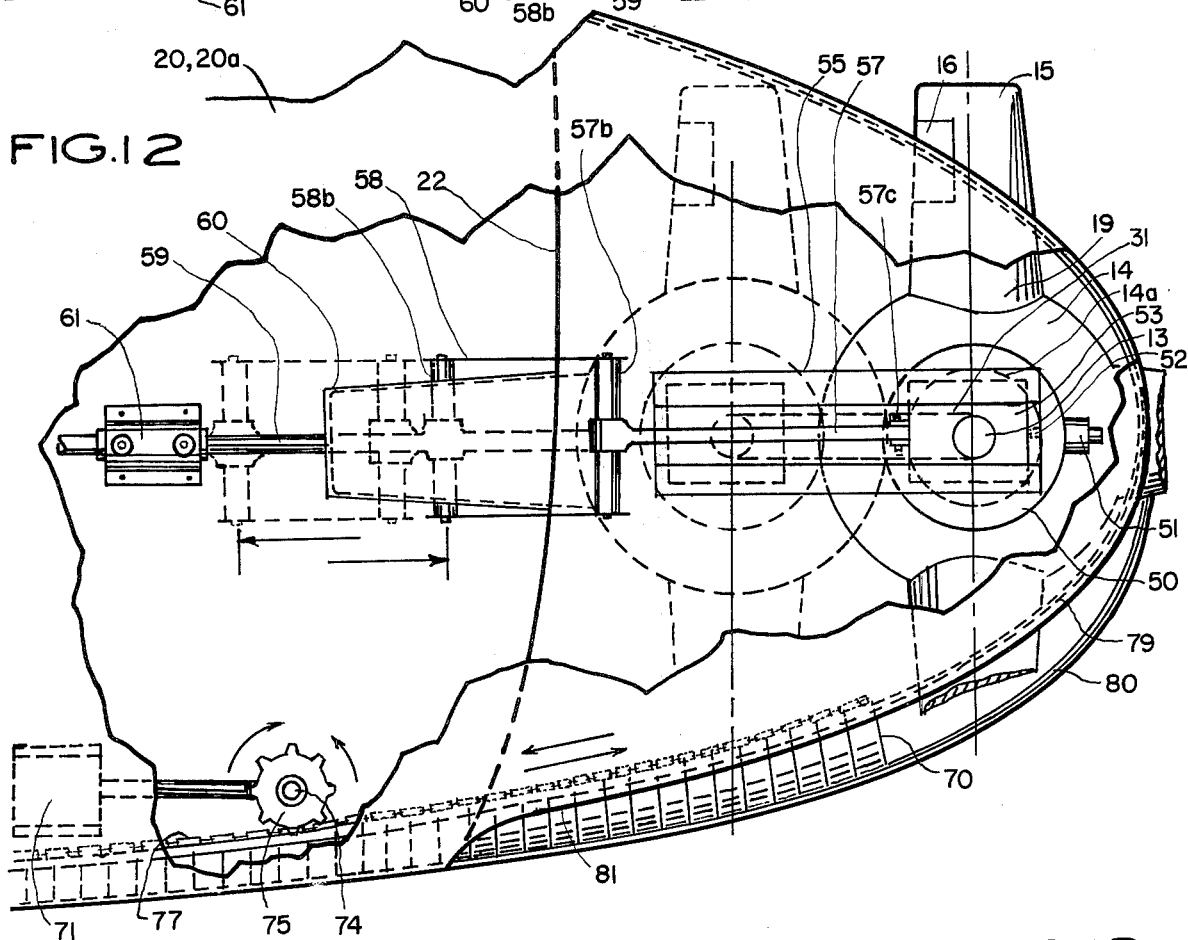
FIG. 12 is a plan view with the skin surface cut away of the wing tip rotor assembly of FIG. 11 and also showing the extended position and the retracted alternate position and the fairing door assembly.

When the aircraft is in normal flight, the lift rotors may be retracted, stored and extended as shown in FIGS. 11 and 12. When the rotor assembly 19 is to be retracted inside the slot 22 off the wing tip rotor assemblies 20 or 20a while the aircraft is in flight, the rotor assembly 19 is first brought to a stop by brake means 50. Then to line up the rotor blade 15 correctly, the rotor assembly 19 is allowed to turn slowly until the energized electric solenoid's core 51 drops into the lock hole 52 on the upper hub portion 14a of the rotor hub 14. With the rotor assembly 19 in this position, it is then possible to retract it. The vertical axis 13, is mounted in the upper and lower bearing blocks 53 and 54, which are contained within a horizontal upper and lower closed end sliding tracks 55 and 56. So when the rotor assembly 19 is locked into place it can be retracted or extended along these closed end sliding tracks 55 and 56 along vertical axis slot opening 31 in the skin above and below the rotor assembly 19 and within slot 22, via the yoke assembly 57, 58 and pivot pins 58b, 57b and 57c, which connects the upper bearing block 53 to the lower bearing block 54 via the control rod 59 and the piovt pin 59b. When the hydraulic power unit 61 is enerized to retract, then the complete rotor assembly 19 is retracted into the slot 22 of the wing tip rotor assembly 20 or 20a with one rotor blade 15 entering the blade housing 60, which produces a cam action upon the flap 16 and pushing it closed and into its housing 16a as the rotor blade 15 enters housing 60. When the rotor assembly 19 is to be extended then all above operations are reversed.

Figure 13:
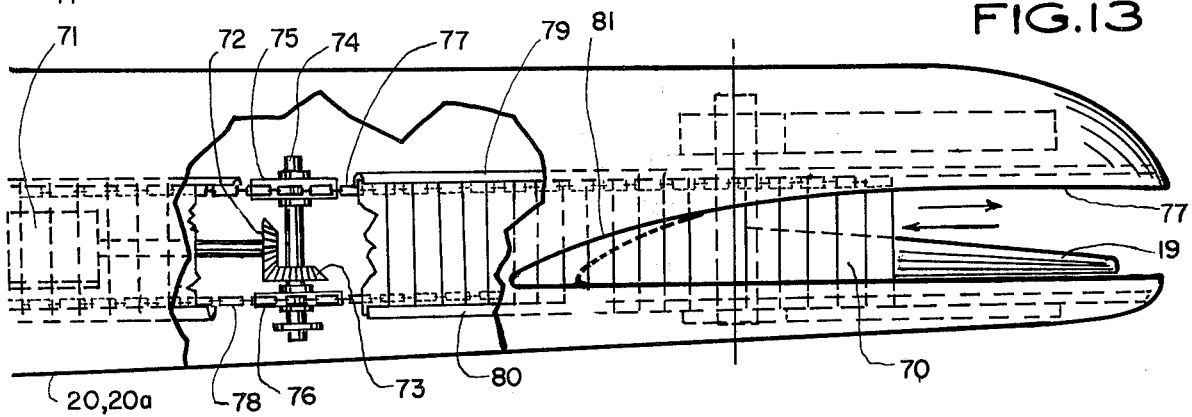
FIG. 13 is an elevation view of FIG. 12 showing an elevation view of the flexible fairing door assembly.

FIGS. 12 and 13 also show a sliding flexible fairing door assembly 70, which resembles a roll-top desk cover or the like, shown partially extended or retracted while the rotor assembly 19 is in a stored and locked position. The power unit 71 which has a forward and reverse movement, drives the pinion gear 72 and pinion gear 73 that is connected to a mutual vertical axis 74, which has a lower and upper sprocket gear 75 and 76; which engages an upper and lower flexible chain linkage 77 and 78 which are attached at the top and lower portions of the flexible fairing door assembly 70. When the power unit 71 moves the flexible fairing door assembly 70, it will travel along an upper and lower sliding track 79 and 80, which the upper and lower edge of the flexible fairdoor assembly 70 travels and is also contained. The flexible fairing door assembly 70 comes out along the leading edge of the wing tip rotor assemblies 20 and 20a through a narrow vertical slot opening 81 in slot opening 22.

The term "rotor" and "lift rotor" used in describing and usage of my invention should be understood to include rigid type rotors, flapping rotors, variable pitch rotors, propellers and any type rotors constructed to produce lift and thrust forces or for just a rotating function.

It also should be pointed out here, that my invention should have uses in other fields, since it produces two distinct energy functions when the air currents actuates it and that is its rotational spin and can at the same time produce lift force. So for clarification and simplification in terms and functions; since this flap is not a true flap as defined in aerodynamic terminology, this unusual flap construction should be known as the "Everett Flap".

My invention could very well become a high energy saving device, especially if it proves its worth on large aircraft. It will allow the aircraft to become airborne sooner than normal and by the same means lower the aircraft in a much shorter landing approach and less landing roll; which should help immensely the reduction in stacking and holding patterns of commercial aircraft. It is obvious that the lift rotors can be power driven and that the rotor blades can be built with variable pitch, which both means are well known to the art. With rotors being power driven, would be highly desirable for emergency use when forward thrust of the aircraft has been lost. During an emergency, these rotor assemblies if hooked up to an auxiliary power source, will provide enough lift balance to retard the aircraft from a fatal nose down crash. The craft would still crash, but in a pancake fashion and with a great deal less impact, thereby the saving of many lives. Mounting these special rotor assemblies to the sides of an aircraft's fuselage would entail very little modification of the aircraft's structure, making it practical for almost any aircraft that is flying today.

The invention described in detail in the foregoing specification is subject to changes and modifications without departing from the principle and spirit thereof. The terminology used for the purpose of description and not of limitation; the scope of the invention being defined in the claims.

What is claimed is:

1. An aircraft with fixed wings,
with rotors mounted to rotate around a vertical axis attached to the aircraft,
a flap structure with a horizontal axis and attached to the surface of each rotor blade,
an air scoop formed along the trailing edge of each flap arranged to face rearwardly of the direction of the rotor blade movement,
a means arranged to permit each flap to pivot on its horizontal axis into a vertical position against a stop, when air currents contact the air scoop,
whereby the underside of the flap is exposed to the pressure from the air currents,
thereby forcing the rotor to rotate horizontally around its vertical axis and create lift force as it spins.

2. An aircraft as defined in claim 1,
wherein the rotors are mounted partially inside a slot opening within the aircraft's wing tips or the like,
whereas the rotor blades are forced to spin through the slot opening,
with the spinning rotor blades that extend outside the slot opening which create lift force, as they spin forward toward the aircraft's direction of flight.

3. An aircraft as defined in claim 2,
wherein said rotors have retractable means for storage within the aircraft,
and the use of the same retractable means for extending the rotors into their operating position.

4. An aircraft,
with rotors mounted to rotate around a vertical axis attached to the aircraft,
a flap structure with a horizontal axis and attached to the surface of at least one rotor blade,
an air scoop formed along the trailing edge of each flap arranged to face rearwardly of the direction of the rotor blade movement,
a means arranged to permit each flap to pivot on its horizontal axis into a vertical position against a stop, when air currents contact the air scoop,
whereby the underside of the flap is exposed to the pressure from air currents,
thereby forcing the rotor to rotate horizontally around its vertical axis and creates lift force as it spins.
the said rotor blades have attached small rotors having a small vertical axis,
a small flap structure attached to the surface of each small rotor blade,
a small air scoop formed along the trailing edge of each small flap arranged to face rearwardly of the direction of the small rotor blade's movement,
a means arranged to permit each small flap to pivot on its horizontal axis, by pressure from air currents to a vertical position against a small stop,
whereby the underside of the small flap is exposed to the pressure from air currents,
thereby forcing the small rotor to spin on its small vertical axis forward into the direction of the aircraft's flight and creating lift forces.

5. An aircraft with fixed wings,
with rotors mounted to rotate around a vertical axis attached to the aircraft,
a flap structure with a horizontal axis and attached to the surface of each rotor blade,
an air scoop formed along the trailing edge of each flap arranged to face rearwardly of the direction of the rotor blade movement,
a means arranged to permit each flap to pivot on its horizontal axis into a vertical position against a stop, when pressure from air currents contact the air scoop,
whereby the underside of the flap is exposed to the pressure from air currents,
thereby forcing the rotor to rotate horizontally around its vertical axis and create lift force as it spins,
wherein the rotors are mounted partially inside a slot opening within the aircraft's wing tips or the like,
whereas the rotor blades are forced to spin through the slot opening,
with the spinning rotor blades that extend outside the slot opening which create the lift force as they spin forward toward the aircraft's direction of flight,
the said rotor blades have attached small rotors having a small vertical axis,
a small flap structure attached to the surface of each small rotor blade,
a small air scoop formed along the trailing edge of each small flap arranged to face rearwardly of the direction of the small rotor blade's movement,
a means arranged to permit each small flap to pivot on its horizontal axis, by pressure from air currents to a vertical position against a small stop, whereby the underside of the small flap is exposed to pressure from the air currents, thereby forcing the small rotor to spin on its small vertical axis forward into the direction of the aircraft's flight and creating lift forces, wherein the said small rotors are mounted partially inside a small slot opening formed within the larger rotor's blade tip, thereby the small rotors are forced to spin on their small vertical axis through the small slot opening by pressure from air currents against the small rotor's scoop and flap, with the small rotor blades that extend outside the small slot opening that create their own lift forces as they spin forward into the direction of the aircraft's flight.

6. An aircraft with fixed wings, with rotors mounted to rotate around a vertical axis attached to the aircraft, a flap structure with a horizontal axis and attached to the surface of each rotor blade, an air scoop formed along the trailing edge of each flap arranged to face rearwardly of the direction of the rotor blade movement, means arranged to permit each flap to pivot on its horizontal axis into a vertical position against a stop, when air currents contact the air scoop, whereby the underside of the flap is exposed to the pressure from air currents, thereby forcing the rotor to rotate horizontally around its vertical axis and create lift force as it spins, wherein the rotors are mounted partially inside a slot opening within the aircraft's wing tips or the like, whereas the rotor blades that extend outside the slot opening which create lift force as they spin forward toward the aircraft's direction of flight, wherein said rotors have retractable means for storage within the aircraft, and the use of the same retractable means for extending the rotors into their operating position, having a movable flexable fairing door, located inside the leading edge of the wing, with means for opening and closing said door, along a sliding track in the outer edge of the wing tip or the like, thereby concealing and exposing the slot opening and the rotor assembly.

7. An aircraft with fixed wings, with rotors mounted to rotate around a vertical axis attached to the aircraft, a flap structure with a horizontal axis and attached to the surface of each rotor blade, an air scoop formed along the trailing edge of each flap arranged to face rearwardly of the direction of the rotor blade movement, a means arranged to permit each flap to pivot on its horizontal axis into a vertical position against a stop, when air currents contact the air scoop, whereby the underside of the flap is exposed to the pressure from air currents, thereby forcing the rotor to rotate horizontally around its vertical axis and create lift force as it spins, wherein the rotors are mounted partially inside a slot opening within the aircraft's wing tips or the like, whereas the rotor blades are forced to spin through the slot opening, with the spinning rotor blades that extend outside the slot opening which create lift force as they spin forward toward the aircraft's direction of flight, wherein the wing tip rotor assembly located on the fixed wings or the like of the aircraft, contain means for changing the pitch of the complete wing tip rotor assembly.

* * * * *